United States Patent [19]

Hurley et al.

[11] 4,196,801
[45] Apr. 8, 1980

[54] CONTAINER TRANSPORT DEVICE

[76] Inventors: Byron H. Hurley, Rte. 1, Box 214-B, Julian, N.C. 27283; Walter G. Ricks, Rte. 1, Box 108C, Pleasant Garden, N.C. 27313

[21] Appl. No.: 851,063

[22] Filed: Nov. 14, 1977

[51] Int. Cl.² .................... B65G 47/68; B65G 47/82
[52] U.S. Cl. .................................. 198/357; 198/451; 198/500
[58] Field of Search .............. 198/357, 367, 448, 449, 198/450, 451, 452, 598, 500, 481

[56] References Cited

U.S. PATENT DOCUMENTS

| 1,281,580 | 10/1918 | Johnson | 198/357 |
|---|---|---|---|
| 1,881,895 | 10/1932 | Olson | 198/357 |
| 2,367,354 | 1/1945 | Kanter | 198/500 |
| 2,404,232 | 7/1946 | Hunter | 198/451 |
| 2,678,124 | 5/1954 | Bergmann | 198/451 X |
| 2,901,083 | 8/1959 | McGrath | 198/357 |
| 3,144,119 | 8/1964 | Nigrelli et al. | 198/451 X |
| 3,850,281 | 11/1974 | Focke et al. | 198/451 |

FOREIGN PATENT DOCUMENTS

| 1107149 | 12/1959 | Fed. Rep. of Germany | 198/448 |
|---|---|---|---|
| 530748 | 12/1940 | United Kingdom | 198/448 |

*Primary Examiner*—James L. Rowland

[57] ABSTRACT

Apparatus whereby objects are pushed in a circular motion from one location to another by a rotatable cam. A guide is used to insure the delivery of the objects to a precise location and control means are employed to activate the movement of the cam.

10 Claims, 9 Drawing Figures

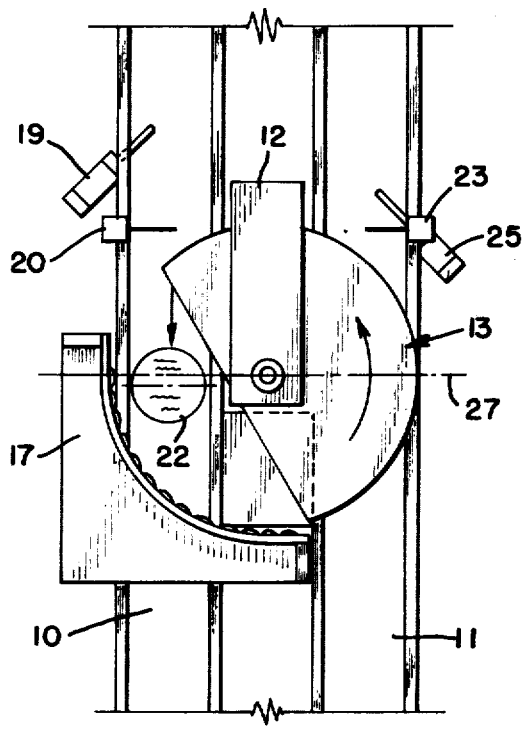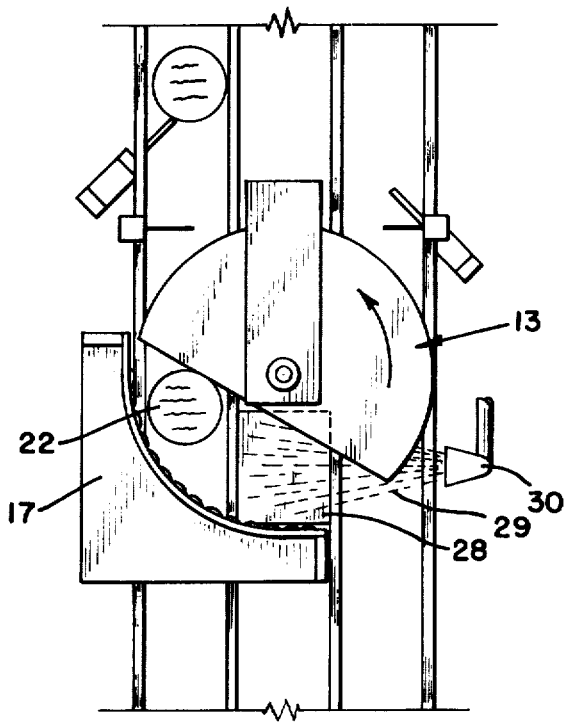
FIG. 5   FIG. 6
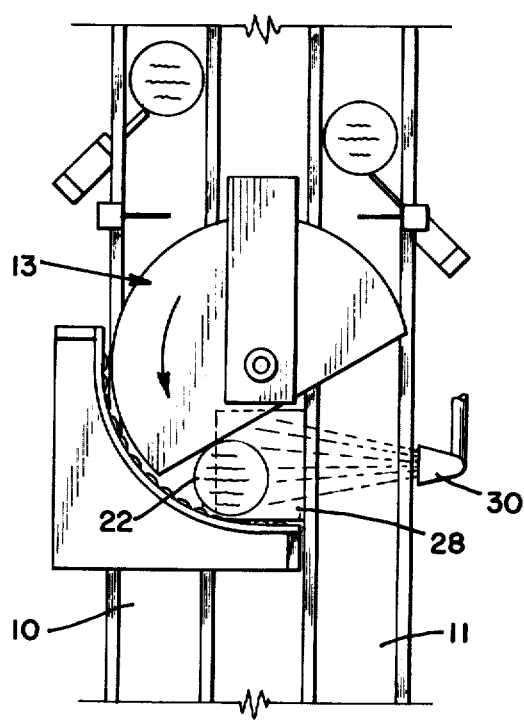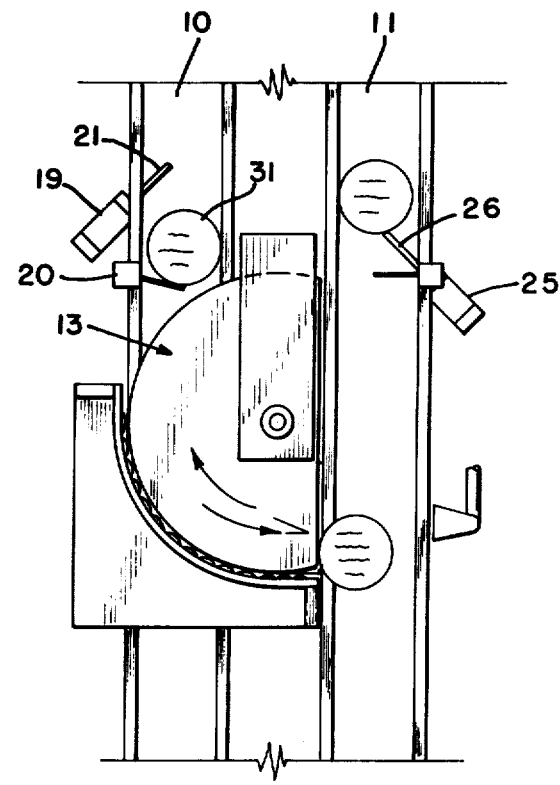
FIG. 7   FIG. 8

CONTAINER TRANSPORT DEVICE

BACKGROUND AND OBJECTIVES OF THE INVENTION

During in-plant processing, many objects, containers and other materials are often required at certain stages of their handling to be moved laterally a few feet or less as they proceed forward along production lines. Various types of conveyor systems are utilized during product manufacturing and processing, and it is quite common to transport unfinished and finished goods along conveyor lines. Bottling and filling plants utilize multiple conveyor lines quite often and frequently it is desirable to reduce two, three, four or more conveyor lines to a single line at some point during the bottling or filling process. For example, one capping machine may have the capacity to cap or seal the production from three or more filling machines and in order to save time and operate a plant more efficiently, it is desirable to supply a single capping machine with the output from three filling machines which for example may be moved along three individual lines. Consequently, the uncapped containers must be transported to a single conveyor or "integrated" to "feed" the capping equipment. Since the containers that are being handled are full of a liquid, extreme care must be used to prevent spillage and hence, movement from one conveyor to another is extremely tedious and any movement must be smooth to avoid tilting and spillage which can result in down time for the conveyor and equipment. Such additional labor costs for cleanup and maintenance operations contribute to higher consumer prices and lessening of market demand.

With this background in mind, the present invention was developed and one of its objectives is to provide a rotatable camming means for transporting an object from one conveyor to another smoothly and efficiently.

It is another object of the present invention to provide an apparatus which will deliver an object from one conveyor to the exact location on another conveyor.

It is still another objective of the present invention to provide an apparatus which will coordinate the spacing between objects on a second conveyor.

It is still yet another objective of the present invention to provide an apparatus for transporting containers filled with liquid from one conveyor to another conveyor without tilting or spilling the container.

It is another objective of the present invention to provide an apparatus for moving objects from one conveyor to another which is relatively inexpensive to manufacture and easy to maintain.

Various other advantages of the present invention will be recognized in the description and drawings which follow.

SUMMARY OF THE INVENTION AND DESCRIPTION OF THE DRAWINGS

This invention consists of an apparatus for moving containers or other objects from one conveyor to another by the use of a rotatable camming means and is of interest should it be desirable to consolidate two or more conveyor lines during the transportation process. For example, two parallel conveyor lines may be transporting filled, uncapped containers of a liquid product. At some point it may be desirable to consolidate the containers onto one conveyor line prior to capping. At the selected consolidation point, the apparatus of the present invention is located as are its various components including stop means power means, signalling means, electrical switches, curved guiding means, conveyor bridging means, lubricating means and other miscellaneous components.

In operation, a filled, uncapped container of liquid reaches a predetermined point on the first conveyor at which time it is engaged by the rotatable camming means which moves the filled container in a circular motion with the assistance of the curved guiding means off the first conveyor onto the bridging member which has been coated with a lubricant to reduce friction and onto the second conveyor at which time the filled container exits the rotatable camming apparatus by the motion of the second conveyor. The second conveyor contains stop means and electrical switches so that any filled container moving along the second conveyor will not be struck or contacted by the rotatable camming means which may pass in part above the second conveyor during rotation.

As the camming means urges the container in a circular direction along the first conveyor, the container is additionally guided by a curved guiding means which is removably fixed to a desired location along the conveyor path. The camming means and curved guiding means direct the container smoothly along a circular arc, from the first conveyor onto a bridge or platform positioned between the first and second conveyors and onto the second conveyor.

The second conveyor transports the container to another location in the plant for subsequent processing such as capping, labelling, or other operations. Since the camming means slides the filled container without lifting it vertically from the conveyors or platform, it has been found advantageous to apply a lubricating solution which may consist of a surfactant and water to the platform during the sliding operation, though other methods may be used to insure a smooth transfer.

As described, the rotatable camming means transports a container from one conveyor to a parallel conveyor, although it should be understood that other conveyor placements or directions of movement may also be utilized with the present invention. Additionally, in the example just given, only uncapped filled containers initially travelling along the first conveyor are mentioned. It is to be understood however that filled containers are also travelling along the second conveyor to the rotatable camming means and electrical switches and stop means control the rotatable camming means so that the containers moving from the first to the second conveyor are done so in synchronized or sequential manner as explained below.

When two containers of filled liquid are moving independently, the first moving on conveyor one and the second moving on conveyor two, and with the first container being slightly ahead of the second, container one will contact a first electrical lever switch which is in its path of travel mounted slightly above the first conveyor. This first switch causes clockwise rotation of the camming means and thereafter determines the activation of first and second pneumatic stop means positioned in juxtaposition to the first and second conveyors, respectively. The pneumatic stop means intercepts any additional containers which may be moving along the conveyors and prevents their forward progress when the stop means are so activated or extended.

Additionally, another electrical switch is located which is controlled or activated by the camming means during its movement. This second switch is so positioned that clockwise rotation of only a few degrees by the camming means will activate the second switch's lever and cause stop means on both conveyors to remain extended after the container leaves switch one and prevents forward container movement along either of the conveyors until such time as the stop means are retracted. Later, at such time as the camming means rotates to its full counterclockwise position, the second switch at that time releases stop means one and two, thus permitting forward progress of any containers which they might have retained. Should both stop means release containers simultaneously, due to the placement of a third switch immediately forward of the stop means positioned along conveyor two, contact with switch three by the container will prevent rotation of the cam until such time as container two has passed the midline of the rotatable camming means. As the container on conveyor two passes beyond the midpoint of the rotatable camming means, the lever of switch three is released, allowing the rotatable camming means to move in the clockwise direction since by this time the container on conveyor two has cleared the path of the camming means.

As the container on conveyor one reaches approximately the midline of the rotatable cam, electrical switch lever one is released, causing the cam to rotate in a counterclockwise direction, thus contacting the container on conveyor one and urging it in a circular path beginning on the first conveyor, across the platform to reduce the friction encountered by the container's sliding movement and the container is urged onto the second conveyor by which it is delivered to another location.

Turning now to the drawings, FIG. 1 illustrates a typical parallel conveyor arrangement with a rotatable camming means therebetween.

FIG. 2 demonstrates the same conveyor configuration as is shown in FIG. 1 but at a slightly later time.

FIG. 5 illustrates the apparatus as shown in FIG. 4 but at a slightly later time interval with the switch now released from the container. The rotatable camming means is now just beginning its counterclockwise rotation.

FIG. 6 demonstrates the camming means as it contacts the container to urge it along a curved path off the first conveyor while the first stop means engages a second container on the first conveyor. The lubricating spray is also shown in operation.

FIG. 7 demonstrates the camming means of FIG. 6 at a slightly later time interval with the container being urged by the rotatable cam onto the bridge means or platform between the parallel conveyors.

FIG. 8 is yet a later illustration of the apparatus as shown in FIG. 7 with the camming means now in its extreme counterclockwise position and with the container now fully transferred to the second conveyor.

Figure 9:
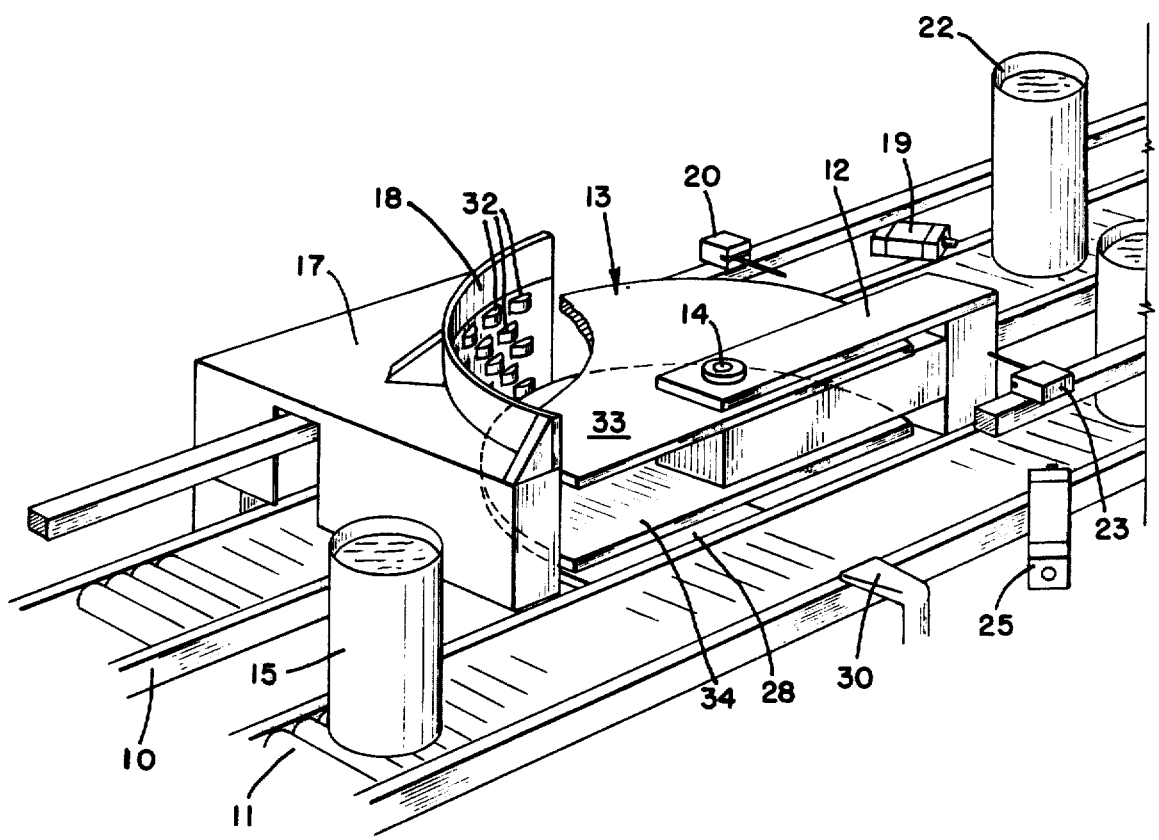

FIG. 9 demonstrates a perspective view of the rotatable camming means with its two planar members of this the preferred embodiment.

Figure 1:
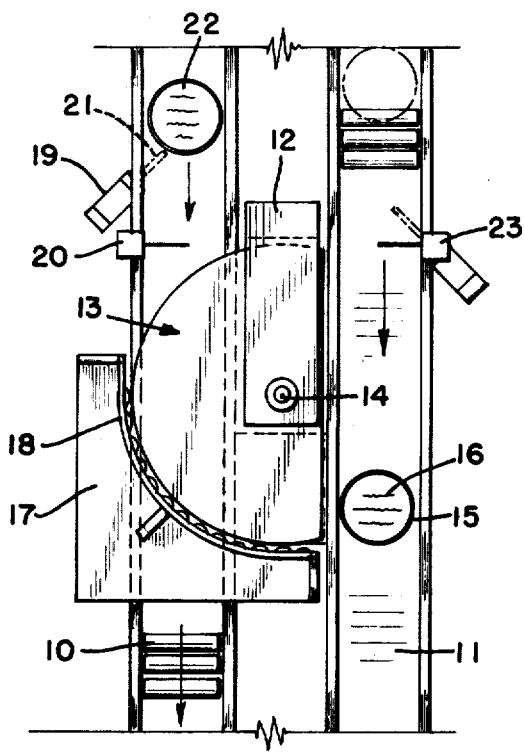

For a detailed description of the drawings, conveyors 10 and 11 are shown in FIG. 1 with upper cam support member 12 therebetween. Camming means 13 is shown in its counterclockwise position as it rotates around cam shaft 14. Container 15 as shown does not have a cap or lid and any sudden movement would cause the contents 16 to be spilled therefrom.

Curved guiding means 17 is shown with guard member 18 affixed thereto for safety purposes.

Guide means 17 is removable and is not permanently joined to the frame of conveyor 10 and may be positioned thereon at any desirable location and bolted or otherwise fixed in place for use with the camming means 13 to assist in guiding the filled container from conveyor 10 to conveyor 11. Stop means 19 is shown in juxtaposition to conveyor 10 and in front of lever switch 20. Stop means 19 has a retractable member 21 which can be extended for three inches, for example, over conveyor 10 in order to prevent additional forward movement by a container, such as container 22, if required. When retractable member 21 is extended from stop means 19, container 22 on conveyor 10 encounters retractable member 21 and is retained, while the conveyor continues to move forward, rolling along the bottom of container 22. When retractable member 21 is retracted, container 22 would then continue its forward progress. As shown in FIG. 1, only container 22 is retained by retractable member 21 although two or more containers may be so restrained. Stop means 19 as shown is of the pneumatic variety, though hydraulic, mechanical, or electrical stop means may be employed.

Figure 2:
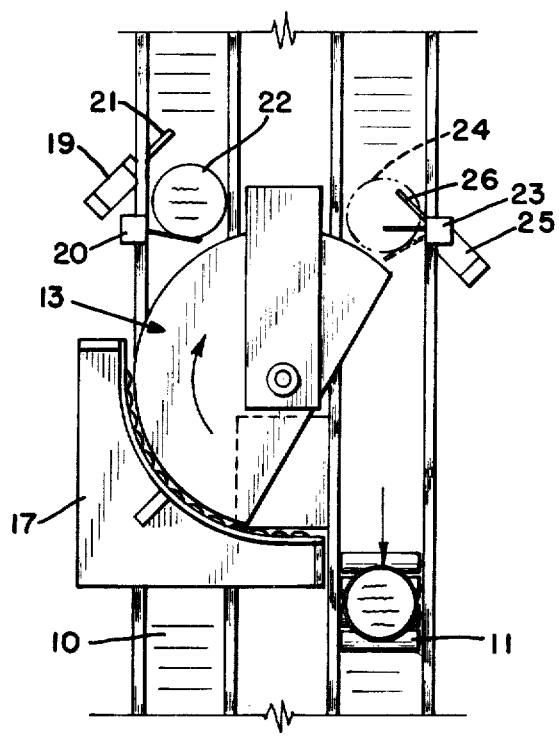

FIG. 2 demonstrates container 22 contacting electrical lever switch 20 causing activation of stop means 19 and 25 extending retractable members 21 and 26 across conveyors 10 and 11, respectively, and causing camming means 13 to begin its clockwise rotation, provided of course that lever switch 23 is not activated by a second container which may be moving along conveyor 11. If lever switch 23 is activated as shown by imaginary container 24 then camming means 13 would not rotate thereby permitting the unobstructed advancement of containers 24 along conveyor 11.

Figure 3:
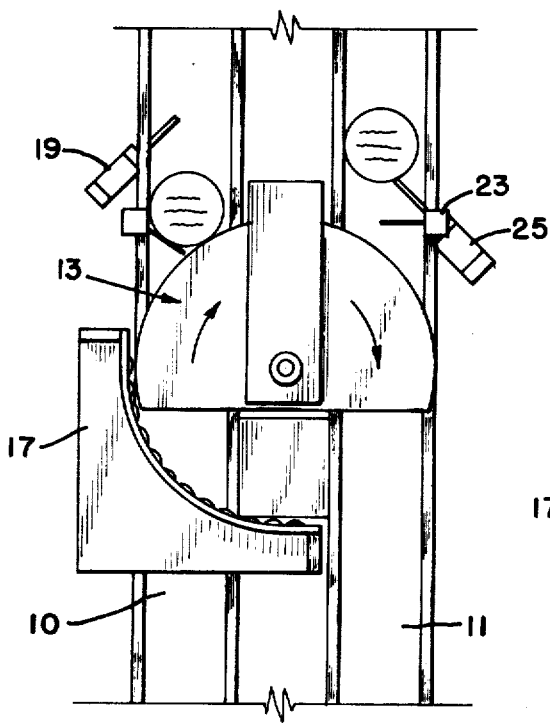
FIG. 3 illustrates the pair or conveyors later in time with the camming means rotated approximately ninety degrees from the position shown in FIG. 1.

In FIG. 3 camming means 13 has rotated 90 degrees from its original position as depicted in FIG. 1 as container 22 has slightly moved forward along conveyor 10.

Figure 4:
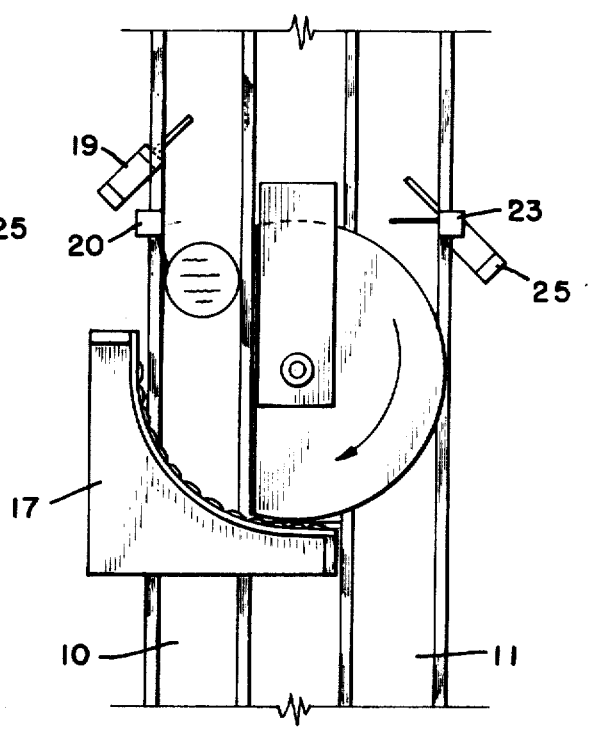
FIG. 4 illustrates the conveyors and camming means at a time slightly later than that shown in FIG. 3 and just prior to switch release by the container with the camming means in full clockwise position.

In FIG. 4 lever switch 20 is just before releasing contact with container 22 and camming means 13 has fully rotated in its clockwise direction.

As shown in FIG. 5, electrical lever switch 20 has now been released from container 22 and camming means 13 now begins its counterclockwise rotation as container 22 is now past midline 27 of camming means 13. Electrical lever switch 20 completes circuitry which allows electricity to flow to an operator valve means (not shown) which allows hydraulic fluid to flow to a hydraulic cylinder (not shown) causing rotation of camming means 13. Hydraulic fluid is pumped to the operator valve by an electric motor pump of sufficient capacity in relation to the hydraulic cylinder employed.

Electrical switch 20 has contacts wired so that as long as container 22 contacts it, the clockwise movement of cam 13 will continue until its full clockwise position is reached as shown in FIG. 4.

In the event that clockwise or counterclockwise rotation of camming means 13 is obstructed, a safety feature consisting of a timing means is employed which prevents further rotation of the camming means by preventing additional hydraulic fluid to pass through the operator valve to the hydraulic cylinder (not shown).

In order to reduce friction as the container 22 slides over bridge means 28, between conveyors 10 and 11, as shown in FIG. 6, a lubricating spray 29 is delivered from spray head 30, said lurbricating spray 29 may be, for example, water with a suitable non-staining surfactant added.

FIG. 7 illustrates container 22 as it slides across bridge means 29 toward conveyor 11.

As shown in FIG. 8, camming means 13 has completed its counterclockwise rotation and is just before beginning clockwise rotation with retractable members 21 and 26 extended from stop means 19 and 25, respectively, to prevent additional containers from travelling forward while camming means 13 rotates rapidly in a clockwise direction whereby the cycle of urging container 31 from conveyor 10 to conveyor 11 begins.

Camming means 13 is shown in FIG. 9 in its full counterclockwise position with guide means 17 positioned to aid in moving the filled containers. Guide rollers 32 are shown in this illustration which will greatly assist the smooth movement of container 31. Guard rail 18 is shown on top of guide means 17 and assists in preventing careless workers from inadvertently placing their hands in the path of the rotatable camming means.

In this the preferred embodiment camming means 13 includes two spatially aligned semicircular planar members, upper planar member 33 and lower planar member 34.

Various objects and materials may be moved from one conveyor to another and the liquid containers as shown in the present invention are merely illustrative of one type that may be handled by the present invention though other sizes and types of objects may also be transported.

The electrical switches and switching arrangements can be arranged in a variety of ways to synchronize the container integration on one conveyor from one or more additional conveyors and the control means as shown here is not presented for the purposes of limiting the scope of the present invention.

We claim:

1. Apparatus for urging an object from a first conveyor means to a second conveyor means comprising: a semicircular camming means positioned between the conveyor means and, when undriven, permitting unobstructed advancement of objects on said second conveyor, said camming means being reversibly rotatable and being driven by power means, said power means including control means, said control means having switch means and stop means said switch means and said stop means being located proximate the first conveyor means, said switch means being activated by an object on the first conveyor whereby activation of said switch means causes said camming means to rotate and contact the object on the first conveyor means urging the object in an arcuate path to the second conveyor means.

2. Apparatus for urging an object as claimed in claim 1, wherein said camming means includes two spatially aligned semicircular planar members.

3. Apparatus for urging and object as claimed in claim 1, wherein said power means includes hydraulic means.

4. Apparatus for urging an object as claimed in claim 1, wherein said control means includes electric lever switches.

5. Apparatus for urging an object as claimed in claim 1, and including a platform between the first and second locations.

6. Apparatus for urging an object as claimed in claim 1, and including a lubricating mechanism.

7. Apparatus for urging an object as claimed in claim 6, wherein said lubricating means includes a spray assembly.

8. Apparatus for urging an object as claimed in claim 1 wherein said stop means includes a pneumatic means.

9. Apparatus for urging an object as claimed in claim 1, including guide means.

10. Apparatus for urging an object as claimed in claim 9, wherein said guide means includes a removable curve means, said curve means having a plurality of guide rollers.

* * * * *